Sept. 24, 1963 MOTOYOSHI OSHIMA ETAL 3,105,095
PROCESS OF LIQUEFACTION OF LIGNIN
Filed April 7, 1959
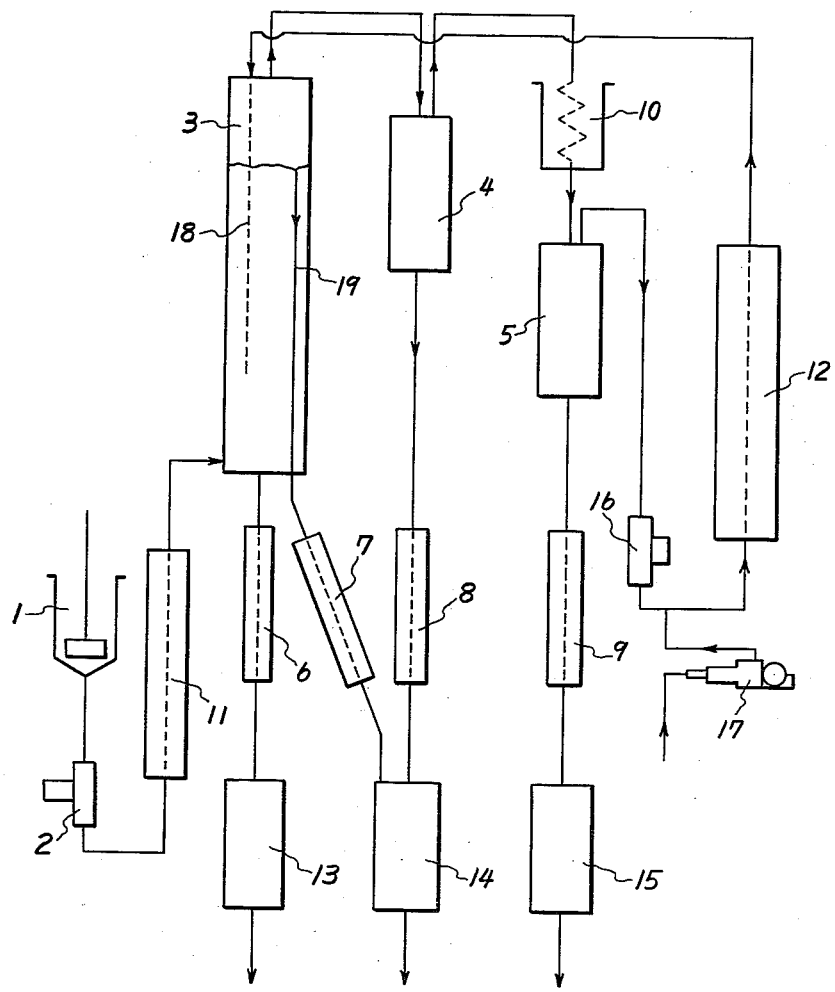

3,105,095
PROCESS OF LIQUEFACTION OF LIGNIN
Motoyoshi Oshima, Yoshio Maeda, and Kan Kashima, Tokyo, Japan, assignors to The Noguchi Institute, Tokyo, Japan, a corporation of Japan
Filed Apr. 7, 1959, Ser. No. 804,774
2 Claims. (Cl. 260—593)

The present invention relates to the process of liquefaction of lignin substances obtained by chemical treatment of wood materials. Such lignin substances include basic calcium lignosulfonate obtained from sulfite spent liquor, thiolignin obtained from sulfate spent liquor by kraft process, acid lignin obtained from wood saccharification and others.

Hitherto various researchers and investigations concerning the process of liquefaction of lignin substances have been published.

Descriptions cited on pages 528 to 529 of "Chemistry of Lignin" (published in 1952, New York) by Friedlich E. Brauns, one of the authorities of lignin chemistry, are summarized as follows:

According to the researchers by Karl Freudenberg et al. for the process of liquefaction of liginin substances in an alkaline medium with or without catalyst, ether extract was obtained at 40.4% yield from lignin substances by extracting the reaction mixture with ether, after subjecting the said lignin to liquefaction for 9 to 12 hours under initial hydrogen pressure of 140 atm. and at reaction temperature of above 300° C.

Further, F. E. Brauns describes, many researches and investigations concerning the process of liquefaction of lignin substances by adding solvent with or without catalyst have been accomplished. Of these, the highest liquefaction yield of lignin substances is shown by B. L. Moldavskii et al. According to researches by Moldavskii et al., such solvents as phenol, lignin tar and others, and such a catalyst as molybdenum sulfide were employed to liquefy the sulfuric acid lignin. The resulting mixture was treated under initial hydrogen pressure ranging 50 to 70 atm. and at reaction temperature ranging 400° to 450° C., obtaining tar at 44% yield.

As is obvious from the above descriptions, in the conventional processes of liquefaction of lignin substances, the liquefaction yield of lignin substances is usually as low as about 40%, while the liquefaction period is as long as 4 to 10 hours.

Furthermore, the products obtained by these conventional processes of liquefaction are always heavy oil or tarry matter consisting of various components, separation of which into each component is extremely difficult. And further, the catalysts used in these conventonal processes of liquefaction are expensive and their recovery is technically very complicated.

The fact that commercial operation of liquefaction of lignin substances has not yet been realized may be ascribable to the low yield of liquefaction and to the difficulty of recovering catalysts.

The first object of the present invention is to provide a process of liquefaction of lignin substances with high yield in an extremely short time using cheap catalysts.

The second object of the present invention is to provide a process for obtaining reaction products easily separable into components which are useful for the synthesis of organic chemicals.

The third object of the present invention is to provide a process of liquefaction of lignin substances not only in an atmosphere of hydrogen gas, but also in an atmosphere of gaseous hydrocarbon or of inert gases.

Further objects, features and advantages of this invention will be apparent from the following description.

Most of the objects of the present invention can be attained by adding the solvents, powdered iron-sulfur type catalysts of the below mentioned group and their promoters if necessary, to the lignin substances and by making the resulting mixture react under high pressure and at high temperature in the atmosphere of hydrogen gas.

The iron-sulfur type catalysts used in this invention are as follows:

The group consisting of iron sulfide, and iron oxides and iron hydroxides mixed with sulfur, inorganic sulfur compounds and organic sulfur compounds, such as, thiourea.

In cases where iron oxides or iron hydroxides are used as the catalyst for liquefaction of sulfur containing-lignin substances, e.g. calcium lignosulfonate and thiolignin, it is not always necessary to add sulfur or sulfur containing compounds.

In this invention, a promoter is also preferably used, such as, copper sulfides or copper compounds which produce copper sulfides in the course of the liquefaction process, for example, copper oxides or copper hydroxides with the addition of sulfur or sulfur containing compounds, such as, thiourea.

Of the above mentioned catalysts, it is preferable, from the economic point of view, to use iron sulfides, or iron oxides, iron hydroxides and mixtures thereof with the addition of sulfur with or without a small quantity of the above identified promoters. It is to be noted that in the case of commercial operation these catalysts may be wasted because of their low cost, thereby avoiding the need for a catalyst recovery system.

The quantity of catalyst in terms of iron sulfide (FeS) amounts to 0.3 to 5%, preferably 0.5 to 1%, of lignin substances, and the quantity of promoters amounts to 0.03 to 0.05 mole of copper atom per mole of iron atom in the catalyst.

The materials used as the solvents of lignin substances in this invention are lignin tar, hydrocarbons of naphthene series (e.g. Tetralin), phenols, gas oil, creosote oil, hydrogenated coal oil and water. They are used individually or in a mixture or two or more of them.

When water alone is used as solvent, the lignin substances used are limited to such hydrophilic one as basic calcium lignosulfonate and thiolignin. The lignin of hydropholic type cannot be used.

The quantity of the solvent used is more than 50% of lignin substances.

The mixture of the above mentioned solvents and mineral oils (e.g. crude oil of paraffin series and high boiling point hydrocarbon oils such as lubricating oil), are used for the liquefaction of lignin substances, the said mineral oils being unable to dissolve the lignin substances but are miscible in the said solvents. The quantity of the mixture used in this case is more than 50% of lignin substances, and the effect of the mixture on liquefaction of lignin substances is almost similar to that of the said solvent alone.

In carrying out the process of this invention, it is preferable to keep pressure high enough, 150 atm. at minimum, to keep the solvents of the lignin substances and almost all components of the reaction products in liquid state at reaction temperature.

In this invention, the reaction is generally carried out under the pressure ranging 150 to 450 atm. The reaction temperature varies slightly according to the catalysts used, and generally it is slightly lower when using iron oxide or iron hydroxide and sulfur as the catalyst. A reaction temperature in the range from 350° to 450° C. is required. When promoters are used with the catalyst, the reaction temperature may be lowered by about 70° C. in every case and the reaction of liquefaction may be completed within 20 to 30 minutes.

The mechanism of the reaction in the process of this invention is not clear at present, but it is supposed that deoxidation of lignin substances occurs first and then reaction of hydrogenation proceeds by the action of iron sulfides catalysts and/or iron sulfides produced in the course of liquefaction process. When promotors are used, the reaction of liquefaction is more active, thus making it possible to use a lower temperature than the case where promotors are not used. In both cases, however, the reaction period is greatly shortened as compared with the conventional processes.

It must be noted that the components of liquefaction products obtained by the present invention differ remarkably from those obtained by the conventional processes. The catalysts used in the present invention have very intense catalytic effect. Accordingly, by using these catalysts, the liquefaction of lignin substances proceeds very effectively in a short period of time even at relatively low temperature with a very high liquefaction yield. Furthermore, in reactions of liquefaction, higher grade hydrocracking takes place as compared with the conventional processes. The liquefied products obtained from two layers, aqueous and oily, by the process of this invention are composed of relatively simple compounds as compared with the tarry product obtained by the conventional processes. These outstanding advantages are the very merits of this invention. In particular, when promotors are used, the catalytic action is so intense that liquefied products of more simple compounds are produced than in the case of using no promotors. The liquefaction of hydrophilic lignin substances, precipitated from the aqueous solution containing them, can be used as they are without drying, and also oil and water, produced by the hydrocracking, separate into two layers, enabling an extremely easy recovery of oil.

The products obtained from the process of this invention are acetone, methanol, etc. from the aqueous layer and monophenols, catechols and aromatic hydrocarbons from the oily layer. However, when promotors are used, relatively small quantities of aromatic hydrocarbons are produced from the oily layer.

The mono-phenols, mentioned above, comprise o-cresol, p-cresol (m-cresol is not produced) p-ethyl phenol, p-propyl phenol and others, and the catechols comprise pyro catechol, methyl catechol, ethyl catechol, p-propyl catechol and others, and the aromatic hydrocarbons comprise m-xylol, ethyl benzene, propyl-benzene and others.

These products are very easily separated by distillation or by other means, and each component obtained can be used as raw materials for useful organic chemicals.

It is also possible to liquefy lignin substances under pressure of not only hydrogen gas but also inert gas such as nitrogen gas when liquid hydrocarbons of naphthene series (e.g. cyclohexane, cyclohexanol, methyl cyclohexane, ethyl cyclopentane, dimethyl cyclohexane and Tetralin, etc.) and crude oil of naphthene series are used.

In these cases, dehydrogenation of the hydrocarbons of naphthene series takes place and various kinds of substances are produced according to the hydrocarbons of naphthene series employed.

For example, benzene is produced when cyclohexane is used, and naphthalene and its derivatives are produced when polycyclic naphthene hydrocarbons are used.

Further in the present invention, it is possible to liquefy the lignin substances by employing such unsaturated hydrocarbons as ethylene and propylene, etc. or natural gas containing these substances and oil cracking gas instead of hydrogen under the same condition as that of using hydrogen. In the above cases, it has been confirmed that besides acetone and methanol in the aqueous layer ethanol, propanol and others are produced, while the products liquefied in the atmosphere of hydrogen contain acetone and methanol in the aqueous layer.

The process of this invention described as above may be carried out continuously, by using for example such apparatus as shown in the accompanying drawing and by the process as described in the example.

Example 1

Calcium lignosulfonate corresponding to 100 parts by weight of lignin, added by 1 part of iron sulfide, was mixed with 150 parts of lignin tar (distilled above 250° C.) to form paste. The resulting mixture was charged into an autoclave and was subjected to reaction for 30 minutes at a reaction temperature of 385° C. under a hydrogen gas pressure ranging 185 to 200 atm., obtaining 86 parts of liquefied product, which could be distilled up to 73% at a temperature below 230° C.

The said liquefied product contains 9.2 parts of acetone and methanol, 12 parts of acidic oil such as pyrocatechol and p-methyl phenol, etc., and 27 parts of aromatic hydrocarbons such as 8 parts of m-xylene, 4 parts of p-xylene, 1 part of o-xylene, 2 parts of n-propyl benzene and 1.5 parts of ethyl benzene.

Example 2

Calcium lignosulfate corresponding to 100 parts by weight of lignin, added by 1 part of the mixture of iron oxide and sulfur (mole ratio of Fe:S is 1:1), was mixed with 150 parts of lignin tar (distilled above 250° C.) to form paste. The resulting mixture was charged into an autoclave and was subjected to reaction for 30 minutes at a reaction temperature of 365° C. under a hydrogen gas pressure ranging 180 to 187 atm., obtaining 90.7 parts of liquefied product, which could be distilled up to 75% at a temperature below 250° C.

The said liquefied product contains 7.8 parts of methanol and acetone, 18.3 parts of acidic oil such as p-methyl phenol, pyrocatechol etc. and 24.6 parts of aromatic hydrocarbons such as m-xylene, ethyl benzene and n-propyl benzene, etc.

Example 3

Calcium lignosulfonate corresponding to 100 parts by weight of lignin, added by 2 parts of a mixture of iron oxide and thiourea (mole ratio of Fe:S is 1:1), was mixed with 150 parts of lignin tar (distilled above 250° C.) to form paste. The resulting mixture was charged into an autoclave and was subjected to reaction for 30 minutes at a reaction temperature between 370° C. and 380° C. under a hydrogen gas pressure ranging 190 to 195 atm., obtaining 93 parts of liquefied product, which could be distilled up to 68% at a temperature below 230° C.

The said liquefied product contains 10.3 parts of methanol and acetone, 13 parts of acidic oils such as pyrocatechol and p-methyl phenol, etc., and 29 parts of aromatic hydrocarbons such as m-xylene, ethylbenzene and n-propyl benzene, etc.

Example 4

Calcium lignosulfonate corresponding to 100 parts by weight of lignin, added by 7 parts of a mixture of iron hydroxide and sulfur (mole ratio of Fe:S is 1:1), was mixed with 300 parts of lubricating oil and 60 parts of lignin tar (distilled above 250° C.) to form paste. The resulting mixture was charged into an autoclave and was subjected to reaction for 30 minutes at a reaction temperature between 420° C. and 430° C. under an ethylene gas pressure of 215 atm., obtaining 81.4 parts of liquefied product.

The said liquefied product contains 21 parts of methanol, ethanol and acetone, 13 parts of acidic oils such as pyrocatechol, and p-methyl phenol, and 30 parts of aromatic hydrocarbons such as m-xylene, ethyl benzene and n-propyl benzene, etc.

Example 5

Calcium lignosulfonate corresponding to 230 parts by weight of lignin, added by 2 parts of a mixture of iron oxide and sulfur (mole ratio of Fe:S is 1:1), was mixed with 300 parts of methyl cyclo-hexane to form paste. The resulting mixture was charged into an autoclave and was subjected to reaction for 30 minutes at a reaction temperature between 350° C. and 360° C. under a nitrogen gas pressure of 185 atm., obtaining 168 parts of liquefied product.

The said liquefied product contains 27.6 parts of methanol and acetone, 36.8 parts of acidic oils such as pyrocatechol and p-methyl phenol, etc., and 73.5 parts of aromatic hydrocarbons such as m-xylene, ethyl benzene and n-propyl benzene, etc. 270 parts of toluene was produced by dehydrogenation of methyl cyclohexane.

Example 6

Calcium lignosulfonate corresponding to 200 parts by weight of lignin, added by 2 parts of a mixture of iron oxide and sulfur (mole ratio of Fe:S is 1:1), was mixed with 300 parts of cyclohexanol to form paste. The resulting mixture was charged into an autoclave and was subjected to reaction for 30 minutes at the reaction temperature between 390° C. and 400° C. under a nitrogen gas pressure of 220 atm., obtaining 178 parts of liquefied product.

The said liquefied product contains 31.2 parts of methanol and acetone, 26 parts of acidic oils such as pyrocatechol and p-methyl phenol etc., and 106 parts of aromatic hydrocarbons such as m-xylene, ethyl benzene, n-propyl benzene and 190 parts of benzene.

Example 7

Calcium lignosulfonate correspondig to 100 parts by weight of lignin, added by 1.3 parts of iron hydroxide, was mixed with 150 parts of crude oil and 150 parts of lignin tar (distilled above 250° C.) to form paste. The resulting mixture was charged into an autoclave and was subjected to reaction for 30 minutes at a reaction temperature between 420° C. and 430° C. under a hydrogen gas pressure of 163 atm., obtaining 75.2 parts of liquefied product.

The said liquefied product contains 6.2 parts of methanol and acetone, 6.44 parts of acidic oils such as pyrocatechol and p-methyl phenol etc., and 32.2 parts of aromatic hydrocarbons such as m-xylene, p-xylene and n-propyl benzene, etc.

Example 8

Calcium lignosulfate corresponding to 200 parts by weight of lignin, added by 7 parts of iron oxide, was mixed with 500 parts of lubricating oil containing 15% of lignin tar (distilled above 250° C.) to form paste. The resulting mixture was charged into an autoclave and was subjected to reaciton for 30 minutes at a reaction temperature between 410° C. and 420° C. under a hydrogen pressure of 196 atm., obtaining 142 parts of liquefied product.

The liquefied product contains 14.6 parts of methanol and acetone, 11.9 parts of acidic oils such as pyrocatechol and p-methyl phenol, etc., and 27.8 parts of aromatic hydrocarbons such as m-xylene, p-xylene, o-xylene and n-propyl benzene, etc.

Example 9

Hydrochloric acid lignin corresponding to 100 parts by weight of lignin, added by 1 part of a mixture of iron ferric oxide and sulfur (mole ratio of Fe:S is 1:1), was mixed with 150 parts of tar (distilled above 250° C.) to form paste. The resulting mixture was charged into an autoclave and was subjected to reaction for 30 minutes at a reaction temperature between 370° C. and 380° C. under a hydrogen gas pressure ranging 223 to 225 atm., obtaining 82 parts of liquefied product.

The said liquefied product contains 7.3 parts of methanol and acetone, 11.8 parts of acidic oil, and 63 parts of aromatic hydrocarbons.

Example 10

Calcium lignosulfate corresponding to 100 parts by weight of lignin, added by iron oxide, coper hydroxide and sulfur (mole ratio of Fe:Cu:S is 20:1:21), was mixed with 150 parts of lignin tar (distilled above 250° C.) to form paste. The resulting mixture was charged into an autoclave and was subjected to reaction for 30 minutes at a reaction temperature between 320° C. and 330° C. under the hydrogen gas pressure ranging 195 to 200 atm., obtaining 87 parts of liquefied product.

The said liquefied product contains 7.2 parts of methanol and acetone, 12 parts of acidic oils such as p-cresol, p-ethyl phenol and pyrocatechol etc., and 22 parts of aromatic hydrocarbons such as m-xylene, ethylbenzene p-xylene and propylbenzene, etc.

Example 11

Calcium lignosulfate corresponding to 200 parts by weight of lignin, precipitated from spent liquor, was added by 1 part of iron sulfide, 0.05 part of copper oxide and 50 parts of phenol. The resulting mixture was charged into an autoclave and was subjected to reaction for 30 minutes at a reaction temperature between 290° C. and 300° C. under a hydrogen gas pressure of 195 atm., obtaining 8.6 parts of liquefied product.

The said liquefied product was separated into an oily layer and a water layer. The water layer was treated with benzene to catch the oily components, and, after evaporating off the benzene, it was added to the oily layer.

The oily layer was fractionated, and 104 parts of fraction distilled below 280° C. and 53.2 parts of fraction distilled above 280° C. were obtained.

The fraction distilled below 280° C. contains 10 parts of methanol and acetone, 72.4 parts of mono-phenols composed of p-cresol, p-ethylphenol and p-propylphenol etc., and 21.6 parts of catechols composed of pyrocatechol, methyl catechol, ethyl catechol and propyl catechol, etc.

Example 12

1,000 parts of liquor containing 200 parts by weight of lignin, obtained from spent liquor by removing sugar and calcium sulphite, was added by 1 part of iron sulfide and 0.05 part of copper oxide. The resulting mixture was subjected to reaction for 30 minutes at a reaction temperature between 320° C. and 330° C. under a hydrogen gas pressure of 220 atm., obtaining 144 parts of liquefied product.

The said liquefied product was separated into an oily layer and a water layer. The water layer was extracted with amyl acetate, and the extract was added to the oily layer after evaporating off the amyl acetate. The oily layer thus obtained was fractionated, yielding 76 parts of fraction distilled below 280° C. and 68 parts of fraction distilled above 280° C.

The fraction distilled below 280° C. contains 65.5 parts of monophenols composed of p-cresol, p-ethylphenol and p-propyl-phenol etc., and 10.5 parts of catechols composed of pyrocatechol, methyl catechol and ethyl catechol, etc.

Example 13

An example for carrying out the process of this invention continuously by using such apparatus shown in the accompanying drawing is illustrated as follows.

A mixture of 200 parts of lignin, 250 parts of lignin tar and 5 parts of catalyst was charged into the mixer 1. The said mixture was agitated to form paste. Then the paste was introduced into the preheater 11 by means of the paste pump 2 at the rate of 3 liter/hour. Preheating the paste at 250° C. in the preheater 11, the preheated paste was introduced into the lower part of the reaction tower 3. Hydrogen gas was compressed to 250 atm. by the compressor 17 and was preheated to about 350° C. in the preheater 12. The hydrogen gas thus preheated was then introduced into the bottom of the reaction tower 3 through the hydrogen blowing pipe 18. In the reaction tower 3, the paste and the hydrogen gas were kept at the temperature between 370° C. and 380° C. to complete the reaction. The liquefied product accompanying the catalyst was taken out of the reaction tower 3 through the overflow pipe 19, and was collected in the receiver 14 through the cooler 7. The misty liquefied product with unreacted hydrogen gas flew out through the tower 3 and was introduced into the mistcatcher 4. After separating the hydrogen gas from the misty liquefied product, the hydrogen gas was introduced into the high temperature separator 5 through the cooler 10. The liquefied product caught in the mistcatcher 4 was cooled in the cooler 8 and then was introduced into the receiver 14. In the high temperature separator 5, volatile matter which was condensed in the cooler 10 was separated. The condensed liquefied product was introduced into the receiver 15 through the cooler 9. The hydrogen gas unconsumed was added to compressed hydrogen, after passing through the high temperature separator 5 and cycling pump 16, and then introduced into the preheater 12 and recycled.

In the drawing, 6 and 13 indicate a cooler and a receiver respectively. They were used to drain the liquefied product in the reaction tower 3 when the liquefaction was completed.

The product caught in the receiver 14 was distilled, and the fraction distilled above 250° C. was used repeatedly as lignin tar.

We claim:

1. A process for liquefaction of a lignin containing substance which comprises subjecting said substance to hydrocracking at an elevated temperature and superatmospheric pressure in the presence of a solvent and a catalyst-catalyst promoter mixture wherein the catalyst constitutes the major amount of said mixture and the promoter constitutes the minor amount; said catalyst being at least one member selected from the group consisting of iron sulfide, an iron compound and sulfur which will produce iron sulfide in said liquefaction process, and an iron compound and a sulfur containing compound which will produce iron sulfide in said liquefaction process; and said promoter being at least one member selected from the group consisting of copper sulfide, a copper compound and sulfur which will produce copper sulfide in said liquefaction process, and a copper compound and a sulfur containing compound which will produce copper sulfide in said liquefaction process.

2. A process for liquefaction of a lignin containing substance selected from the group consisting of calcium lignosulfate, calcium lignosulfonate and hydrochloric acid lignin, in order to produce acetone, methanol, monophenols, catechols and aromatic hydrocarbons; comprising mixing said lignin containing substance with at least one solvent selected from the group consisting of lignin tar, a mixture of lignin tar and lubricating oil, methyl cyclohexane, cyclohexanol and phenol, and with at least one catalyst selected from the group consisting of iron sulfide, and mixtures of iron oxide with sulfur, iron oxide with thiourea, iron hydroxide with sulfur, and iron hydroxide with thiourea; said mixture including at least one promoter selected from the group consisting of copper sulfide and mixtures of copper oxide with sulfur, copper oxide with thiourea, copper hydroxide with sulfur, and copper hydroxide with thiourea, the quantity of said promoter being from 0.03 to 0.05 mole of copper atom in said promoter per mole of iron atom in said catalyst, the quantity of said solvent being more than 50%, by weight, of the amount of lignin in said lignin containing substance, and the quantity of said catalyst, in terms of iron sulfide, being from 0.3% to 5.0%, by weight, of said amount of lignin, and hydrocracking said mixture of the lignin containing substance and the catalyst and the promoter in hydrogen at a temperature in the range from 350° C. to 450° C., and at a pressure in the range from 150 atm. to 450 atm.

References Cited in the file of this patent

UNITED STATES PATENTS

| 2,331,154 | Adkins | Oct. 5, 1943 |
| 2,390,063 | Freudenberg et al. | Dec. 4, 1945 |
| 2,870,133 | Giesen | Jan. 20, 1959 |

FOREIGN PATENTS

| 759,811 | Great Britain | Oct. 24, 1956 |